United States Patent

Sakamoto et al.

[11] Patent Number: 6,147,950
[45] Date of Patent: *Nov. 14, 2000

[54] RECORDING AND REPRODUCING APPARATUS AND RECORDING AND REPRODUCING METHOD

[75] Inventors: Hiroshi Sakamoto, Chiba; Nobuaki Hisamatsu, Tokyo; Tomohiro Obita, Kanagawa; Takahiro Yamaguchi, Kanagawa; Yozo Tanaka, Kanagawa, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/944,685

[22] Filed: Oct. 7, 1997

[30] Foreign Application Priority Data

Oct. 9, 1996 [JP] Japan .................................. 8-268984

[51] Int. Cl.[7] ..................................................... G11B 7/80
[52] U.S. Cl. .................................. 369/84; 369/30; 369/34
[58] Field of Search .............................. 369/124, 84, 83, 369/58, 54, 32, 36, 30; 360/15

[56] References Cited

U.S. PATENT DOCUMENTS

| | | | |
|---|---|---|---|
| 4,707,750 | 11/1987 | Anderson et al. | 360/15 |
| 5,097,461 | 3/1992 | Majima | 369/84 |
| 5,146,369 | 9/1992 | Yamaguchi | 360/15 |
| 5,301,181 | 4/1994 | Shiba et al. | 369/84 |
| 5,349,477 | 9/1994 | Shuto | 360/15 |
| 5,610,893 | 3/1997 | Soga et al. | 369/84 |
| 5,615,189 | 3/1997 | Kuribayashi | 369/84 |
| 5,862,104 | 1/1999 | Matsumoto | 369/84 |
| 5,909,421 | 6/1999 | Yatomi | 369/84 |

FOREIGN PATENT DOCUMENTS

| | | |
|---|---|---|
| 0254254 A2 | 1/1988 | European Pat. Off. . |
| 0449607 A1 | 10/1991 | European Pat. Off. . |
| 0612067 A2 | 8/1994 | European Pat. Off. . |

OTHER PUBLICATIONS

Patent Abstracts of Japan, vol. 015, No. 305 (P–1234), JP 3–108157, Published May 8, 1991.
Patent Abstracts of Japan, vol. 016, No. 457 (P–1426), JP 4–162282, Published Jun. 5, 1992.

*Primary Examiner*—Nabil Hindi
*Attorney, Agent, or Firm*—Limbach & Limbach L.L.P.

[57] ABSTRACT

A turntable is a table mounted to a shaft (4) of a spindle motor and the turntable supports a laminated disc thereon and drives the disc in rotation. The laminated disc includes a lower disc and an upper disc stacked on the lower disc, and is supported on a disc-supporting surface. When the disc is loaded on the turntable, a fitting member fits into the center hole of the laminated disc for centering the laminated disc with respect to the shaft. The fitting member fits the center hole of the lower disc when the laminated disc is supported on said disc-supporting surface. The turntable may include a tapered member which guides the laminated disc to the disc-supporting surface. The laminated disc includes lower and upper discs each having an edge which defines the center hole. The corners of the edges are cut away along a circumference of the center hole. The upper and lower discs are placed together so that the cut-away corner directly face each other.

14 Claims, 11 Drawing Sheets

RECORDING AND REPRODUCING APPARATUS AND RECORDING AND REPRODUCING METHOD

BACKGROUND OF THE INVENTION

1. Field of the Invention

This invention relates to a recording and reproducing apparatus and a recording and reproducing method. Particularly, it relates to a recording and reproducing apparatus and a recording and reproducing method in which output signals from a reproducing unit are supplied to a recording unit for performing recording operation.

2. Description of Related Art

As media for recording information signals, such as, audio signals, optical discs which are high-density recording media have been broadly used. The optical discs are randomly accessible, have small diameter and thickness, and are housed in cartridges. Therefore, the optical discs are characterized by their easiness in handling. Such optical discs are roughly classified into optical discs capable of repeated recording/reproduction, such as, magneto-optical discs and phase-changed type optical discs, and optical discs for reproduction only, such as, so-called compact discs.

By using the above-mentioned recordable optical disc, since information signals like audio signals are recorded as digital signals, reproduced sounds of high quality may be obtained. In addition, editing and duplication may be carried out easily without substantially deteriorating the sound quality.

Meanwhile, as reproducing apparatuses for the so-called compact discs (CDs) as described above, various reproducing apparatuses which have a media exchange mechanism (changer) capable of housing a plurality of discs in a predetermined housing section, then taking out the discs in an arbitrary order, and continuously reproducing the discs have been proposed. However, with respect to recording apparatuses for carrying out recording on recordable optical discs, few of these recording apparatuses currently have the changer function.

Therefore, in sequentially recording information signals like audio signals onto a plurality of disc-shaped recording media, the disc-shaped recording media must be sequentially inserted one by one into a recording apparatus by manual operation. It has been difficult to carry out such editing operation over a long period of time.

Thus, a recording and reproducing apparatus has been demanded which is capable of selecting information signals like audio signals to be recorded on each disc-shaped recording medium and designating in advance the disc-shaped recording medium for recording such information signals and which has a media exchange mechanism so that it is not necessary to sequentially insert the media one by one into the recording apparatus by manual operation.

SUMMARY OF THE INVENTION

It is therefore an object of the present invention to provide recording and reproducing apparatus which resolves the above-mentioned problem.

It is another object of the present invention to provide a recording and reproducing method which resolves the above-mentioned problem.

According to the present invention, there is provided a recording and reproducing apparatus including a reproducing unit and recording unit. The reproducing unit has a first recording medium loaded thereon and reproduces the loaded first recording medium. The recording unit records information signals reproduced by the reproducing unit onto a recordable second recording medium having a recording area which is capable of recording information signals therein and a management information area in which management information including at least table of contents information of the information signals recorded in the recording area is recorded. The recording unit supplies to the reproducing unit a control signal indicating completion of preparation for recording the information signals onto the second recording medium. The reproducing unit starts reproducing the first recording medium on the basis of the control signal indicating completion of preparation for recording supplied from the recording unit, and supplies reproduced signals to the recording unit.

According to the present invention, there is also provided a recording and reproducing apparatus including a reproducing unit and a recording unit. The reproducing unit has a plurality of first recording media loaded thereon and reproduces one of the plurality of loaded first recording media. The recording unit has a plurality of recordable second recording media loaded thereon, each having a recording area which is capable of recording information signals therein and a management information area in which management information including at least table of contents information of the information signals recorded in the recording area is recorded, and records information signals onto one of the plurality of loaded second recording media. The recording unit records the information signals reproduced by the reproducing unit onto the second recording medium. The recording unit supplies to the reproducing unit a control signal indicating completion of preparation for recording the information signals onto the second recording medium. The reproducing unit starts reproducing one of the first recording media on the basis of the control signal indicating completion of preparation for recording supplied from the recording unit, and supplies reproduced signals to the recording unit.

According to the present invention, there is also provided a recording and reproducing method. The method uses a reproducing unit for reproducing one of a plurality of first recording media which are housed in a first housing section and in which information signals are recorded, and a recording unit for recording the information signals reproduced by the reproducing unit into one of recordable second recording media which are housed in a second housing section and each of which has a recording area capable of recording information signals therein and a management information area having recorded therein management information including at least table of contents information of the information signals recorded in the recording area. The method includes the steps of: taking out one of the first recording media from the first housing section, loading the one first recording medium onto the reproducing unit, and setting the reproducing unit to a reproduction standby state for the loaded first recording medium; and taking out one of the second recording media from the second housing section, loading the one second recording medium onto the recording unit, setting the recording unit to a recording standby state for the loaded second recording medium, and outputting a control signal indicating completion of preparation for recording. The reproducing unit starts reproducing the first recording medium on the basis of the control signal indicating completion of preparation for recording supplied from the recording unit and supplies reproduced signals to the recording unit. The recording unit records the reproduced signals supplied thereto onto the second recording medium.

DESCRIPTION OF THE INVENTION

The recording and reproducing apparatus according to the present invention will now be described in detail with reference to the drawings. As a recording and reproducing apparatus according to an embodiment of the present invention, a recording and/or reproducing apparatus for recording information signals reproduced from an optical disc of reproduction-only type such as a so-called compact disc (hereinafter referred to simply as an optical disc) onto a recordable optical disc such as a magneto-optical disc (hereinafter referred to as a recordable disc) is explained.

Figure 1:
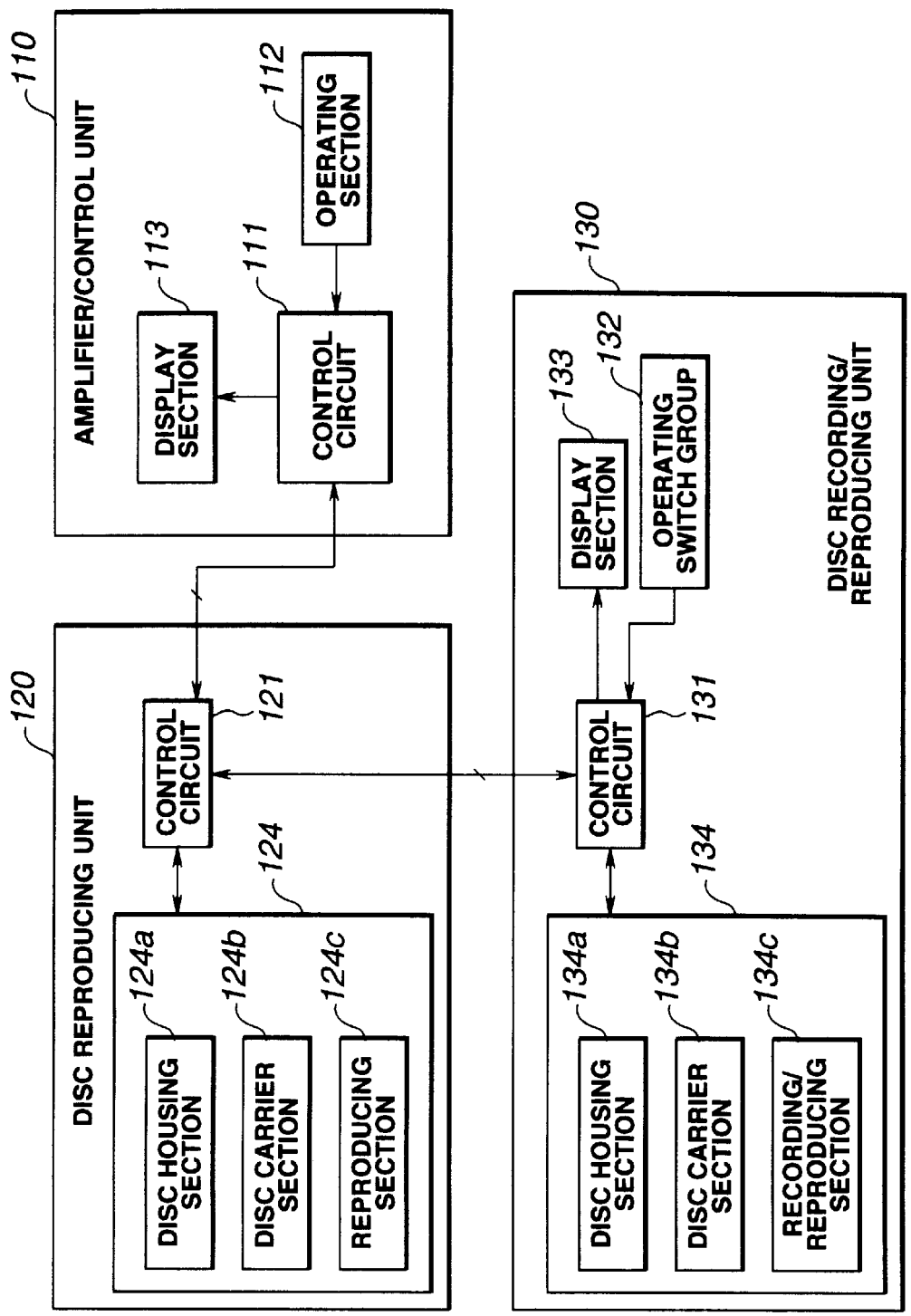
FIG. 1 is a block diagram showing an exemplary structure of a disc recording and/or reproducing apparatus according to an embodiment of this invention.

FIG. 1 is a block diagram showing an exemplary structure of essential portions of the disc recording and/or reproducing apparatus according to the embodiment of the present invention.

This disc recording and/or reproducing apparatus includes an amplifier/control unit 110, a disc reproducing unit 120, and a disc recording/reproducing unit 130. These units transmit and receive various types of control information to and from one another via bus lines. As a matter of course, information signals like audio signals are transmitted and received between the units.

The amplifier/control unit 110 has means for supplying electric power to the entire disc recording and/or reproducing apparatus and controlling the entire apparatus. The amplifier/control unit 110 also has a function to amplify information signals like audio signals outputted from the disc reproducing unit 120 or the disc recording/reproducing unit 130 as later described, and supply the amplified information signals to a speaker, not shown. This amplifier/control unit 110 includes a control circuit 111 which is means for transmitting and receiving control signals to and from each unit of the disc recording and/or reproducing apparatus via a bus line to control the entire apparatus, an operating section 112 having a switch, a dial and the like for indicating operation to the control circuit 111, and a display section 113 having a liquid crystal display or the like for displaying the operating state of each unit of the apparatus based on the information from the control circuit 111.

The disc reproducing unit 120 has a function to reproduce information signals like audio signals from plural optical discs. The disc reproducing unit 120 includes a control circuit 121 which is means for transmitting and receiving control signals to and from each unit of the disc recording and/or reproducing apparatus via a bus line to control the operation of the disc reproducing unit 120, and a disc exchange and reproducing section 124 for reproducing information signals like audio signals from plural optical discs. The disc exchange and reproducing section 124 further includes a disc housing section 124a as means for housing plural optical discs having information signals recorded thereon, a disc carrier section 124b as means for loading and chucking the optical disc housed in the disc housing section 124a to a spindle on the basis of the control signal from the control circuit 121 and also as means for unloading the chucked optical disc, and a reproducing section 124c as means for reproducing information signals from the optical disc carried and chucked to the spindle.

The disc recording/reproducing unit 130 has a function to record and reproduce information signals like audio signals with respect to plural recordable optical discs. This disc recording/reproducing unit 130 includes a control circuit 131 as means for transmitting and receiving control signals to and from each unit of the disc recording and/or reproducing apparatus via a bus line to control the operation of the disc recording/reproducing unit 130, an operating switch group 132 having a switch, a dial and the like for indicating operation to the control circuit 131, a display section 133 having a liquid crystal display for displaying the operating state of each unit of the apparatus based on the information from the control circuit 131, and a recording/reproducing section 134 for recording/reproducing information signals like audio signals onto/from the plural recordable discs. The recording/reproducing section 134 further includes a housing section 134a for housing the plural recordable discs on which information signals are to be recorded, a carrier section 134b as means for loading and chucking the recordable disc housed in the housing section 134a to a spindle on the basis of the control signal from the control circuit 131 and also as means for unloading the chucked recordable disc, and a recording/reproducing section 134c as means for recording and reproducing information signals onto and from the recordable disc carried and chucked to the spindle.

In the disc recording and/or reproducing apparatus having the above-described structure according to the present invention, the disc reproducing unit 120 receives a recording preparation completion signal indicating completion of preparation for recording supplied from the disc recording/reproducing unit 130, and starts reproducing the optical disc. The disc recording/reproducing unit 130 records information signals reproduced from the optical disc and supplied from the reproducing unit 120 onto the recordable disc. In this case, as the information signals reproduced from the disc and transmitted to the disc recording/reproducing unit 130, for example, signals between musical pieces are used.

For example, the recording preparation completion signal outputted from the recording/reproducing unit 130 is outputted after loading the recordable disc onto the recording/reproducing unit 130, reading the table of contents information of the recordable disc, accessing a recording start point of the recordable disc by a head, and setting a recording standby state.

The amplifier/control unit 110, the disc reproducing unit 120 and the disc recording/reproducing unit 130 may have a structure of so-called component stereo system in which devices housed in individual casings are combined, or may have a structure such that the units are housed and integrated in a single casing.

Figure 2:
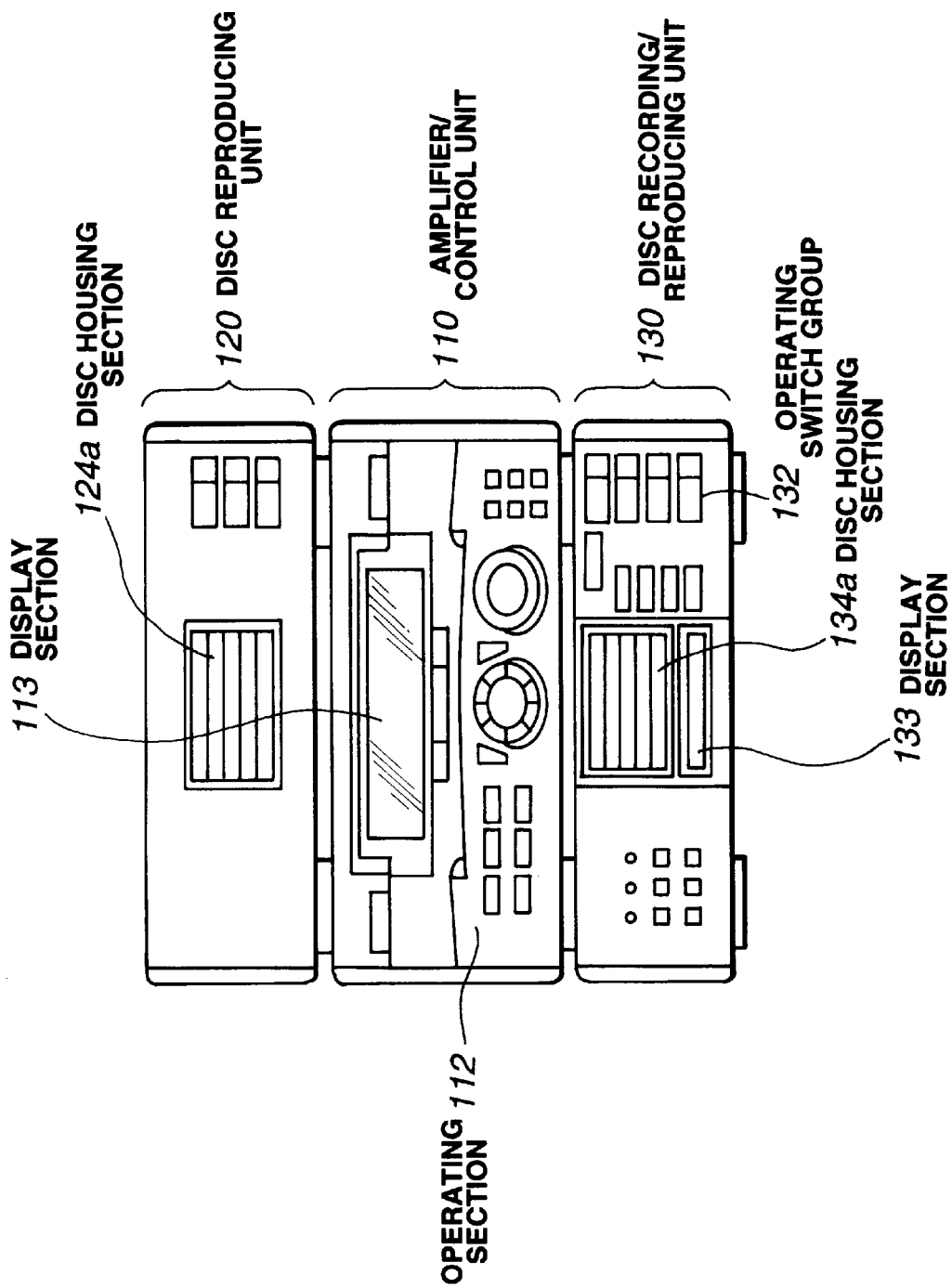
FIG. 2 is a view showing an example of appearance and an operating section of the disc recording and/or reproducing apparatus according to the embodiment of this invention.

FIG. 2 is a view showing an example of appearance of the disc recording and/or reproducing apparatus having the structure as shown in FIG. 1. From the top, the disc reproducing unit 120, the amplifier/control unit 110, and the disc recording/reproducing unit 130 are shown. The amplifier/control unit 110 includes the control circuit 111 for controlling the disc reproducing unit 120 and the disc recording/reproducing unit 130, as described above. The amplifier/control unit 110 also includes the operating section 112 provided with various dials and keys for performing various inputs to the control circuit 111, and the display section 113 including a large-size liquid crystal panel or a fluorescent indicator panel for displaying the operation of the entire disc recording and/or reproducing apparatus via the control circuit 111.

This disc recording and/or reproducing apparatus has the function to record audio signals obtained by reproducing the optical disc at the disc reproducing unit 120 onto the disc-shaped recording medium at the disc recording/reproducing unit 130. In this case, so-called dubbing may be carried out in which the reproduction start timing for the optical disc and the recording start timing for the disc-shaped recording medium are caused to coincide with each other.

The disc recording and/or reproducing apparatus has the following four types of modes as dubbing modes:

(1) "normal" mode;
(2) "5 to 5" mode;
(3) "1 to 5" mode; and
(4) "5 to 1" mode.

These modes are selected by a user who operates a selector dial of the operating section 112 of the amplifier/control unit 110.

The above-mentioned (2) "5 to 5" mode and (4) "5 to 1" mode are reproduction modes which may be selected in a disc reproducing apparatus having a medium exchange mechanism (changer) for reproducing so-called compact discs.

The above-mentioned (1) "normal" mode is the simplest mode in which information signals reproduced by the disc reproducing apparatus are sequentially recorded on the optical disc by the disc recording apparatus. The reproduction mode in the disc reproducing apparatus has been conventionally known, and is exemplified by a "1/ALL" mode for selecting whether to reproduce only one optical disc or to reproduce all the optical discs, a "program" mode for reproducing musical pieces recorded on the optical disc in a predetermined order, or a "random reproduction" mode for reproducing in a random order. In the disc reproducing apparatus having the disc exchange mechanism (changer), there is a mode such that recording is sequentially carried out from five discs to one recording medium.

The above-mentioned (2) "5 to 5" mode is a mode for recording from five optical discs to five recordable discs. That is, it is a mode such that the contents recorded on the five optical discs housed in the disc housing section 124a of the disc reproducing unit 120 can be recorded onto the five recordable discs housed in the housing section 134a of the disc recording/reproducing unit 130.

The above-mentioned (3) "1 to 5" mode is a mode for recording from one optical disc to five recordable discs. That is, it is a mode such that the contents recorded on an arbitrary one of up to five optical discs housed in the disc housing section 124a of the disc reproducing unit 120 can be sequentially recorded and duplicated onto each of the five recordable discs housed in the housing section 134a of the disc recording/reproducing unit 130.

The above-mentioned (4) "5 to 1" mode is a mode for sequentially reproducing only the musical piece on the first track of each of the five optical discs and recording it onto one recordable disc, and this mode is referred to as a "hit parade" mode. That is, it is a mode such that only the contents recorded on an arbitrary track (for example, the first track) of each of up to five optical discs housed in the disc housing section 124a of the disc reproducing unit 120 can be sequentially recorded onto arbitrary one of up to five recordable discs housed in the housing section 134a of the disc recording/reproducing unit 130.

The operating section 112 of the amplifier/control unit 110 has a selector dial and keys for selecting various menus. Specifically, these keys include a play key (PLAY), a pause key (PAUSE), and a stop key (STOP) for causing the disc reproducing unit 120 and the disc recording/reproducing unit 130 to start, stand by for, and end the reproducing operation, and a rec key for causing the disc recording/reproducing unit 130 to carry out the recording operation.

To select the "dubbing mode" for duplicating the contents of plural optical discs onto plural recordable discs, or the mode for sequentially recording only the first musical piece of plural optical discs onto one recordable disc as in the above-described "hit parade" mode, the user turns the selector dial to select the mode. When carrying out input setting of more detailed conditions, the user uses cursor keys and an enter/next key for determining input data.

Prior to specific explanation of the disc recording and/or reproducing apparatus according to the embodiment of the present invention, the recordable disc used in the present invention is now explained.

Figure 3A:
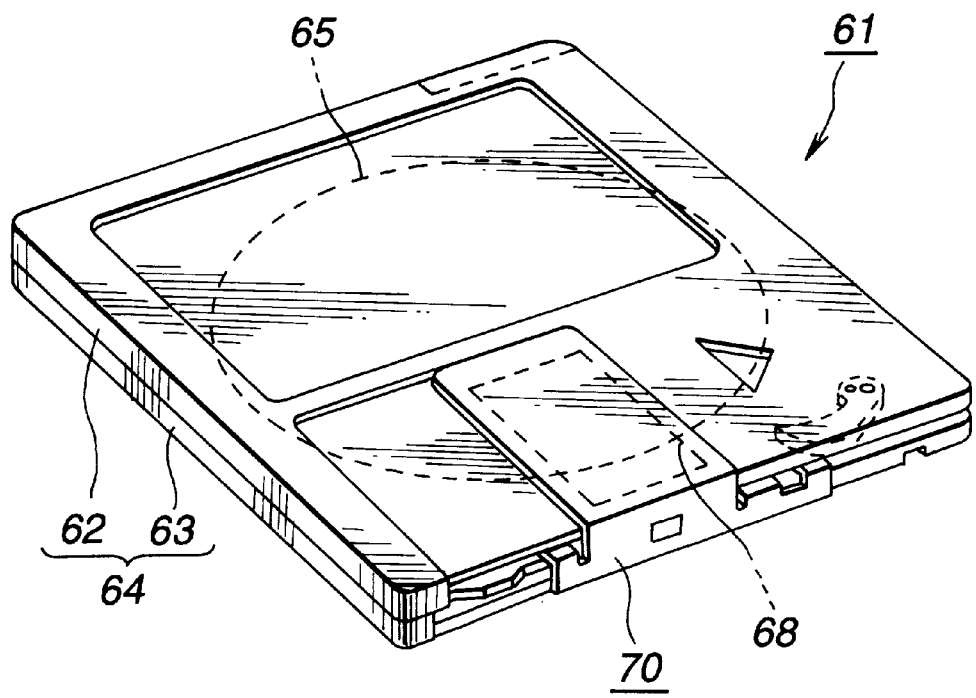
FIGS. 3 (a) and 3(b) are perspective views showing a disc cartridge, from upper and lower sides thereof, used in the disc recording and/or reproducing apparatus according to the embodiment of this invention.
Figure 3B:
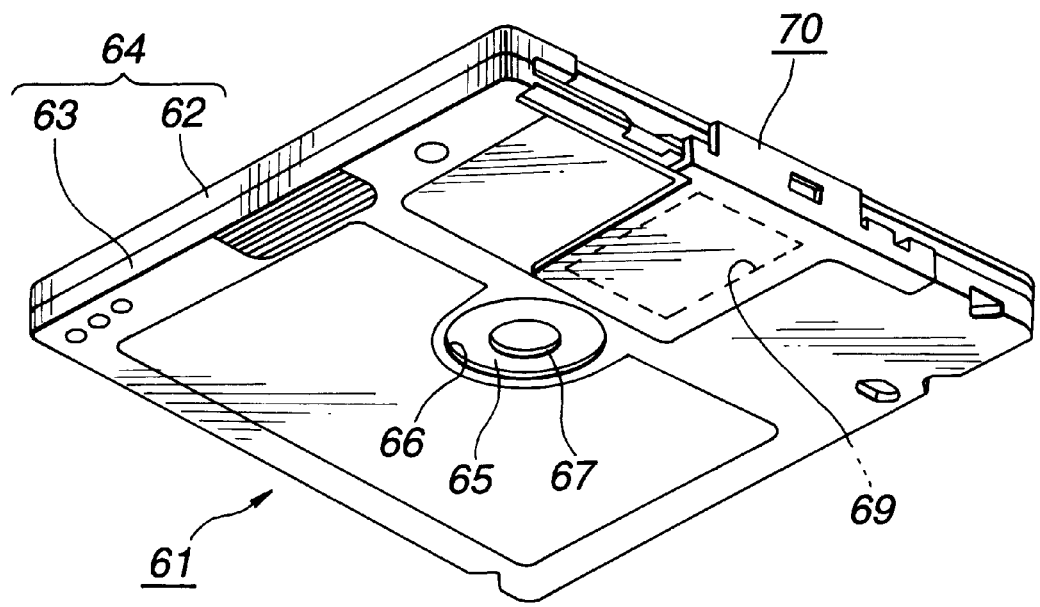

FIGS. 3(a) and 3(b) show a state where a magneto-optical disc as the recordable disc is housed in a disc cartridge. FIG. 3(a) is a perspective view showing the disc cartridge from the upper side. FIG. 3(b) is a perspective view showing the disc cartridge from the lower side.

The disc cartridge has a cartridge body 64 which is constituted by joining an upper half 62 and a lower half 63, each being formed by molding synthetic resin into a rectangular shape. A magneto-optical disc 65 is housed in the cartridge body 64.

The magneto-optical disc 65 used in this embodiment has a diameter of about 64 mm, and a storage capacity for recording audio signals for 74 minutes at maximum.

On the lower half 63 of the cartridge body 64, as shown in FIG. 3(b), a disc table entry opening portion 66 is provided which a disc table of a disc rotation driving mechanism for rotating the magneto-optical disc 65 enters when the disc cartridge 61 is loaded on the disc recording and/or reproducing apparatus. Specifically, this disc table entry opening portion 66 is formed so as to expose, outward, an inner peripheral portion of the magneto-optical disc 65 including a metal plate 67 as a disc clamping magnetic plate mounted to cover a center hole of the magneto-optical disc 65 housed inside of the cartridge body 64.

On the upper and lower sides of the cartridge body 64, that is, on the upper and lower halves 62, 63, information signal recording/reproducing opening portions 68, 69 are provided which expose, outward, at least a part of a signal recording area in the radial direction of the magneto-optical disc 65 housed therein. Each of these recording/reproducing opening portions 68, 69 is formed in a rectangular shape at a substantially center position in left and right directions of the cartridge body 64, from the vicinity of the disc table entry opening portion 66 shown in FIG. 3(b) to the front end side of the cartridge body 64.

On the cartridge body 64 constituted as described above, a shutter member 70 for opening and closing the recording/reproducing opening portions 68, 69 is mounted to be fit from the front end side of the cartridge body 64, as shown in FIGS. 3(a) and 3(b).

Figure 4:
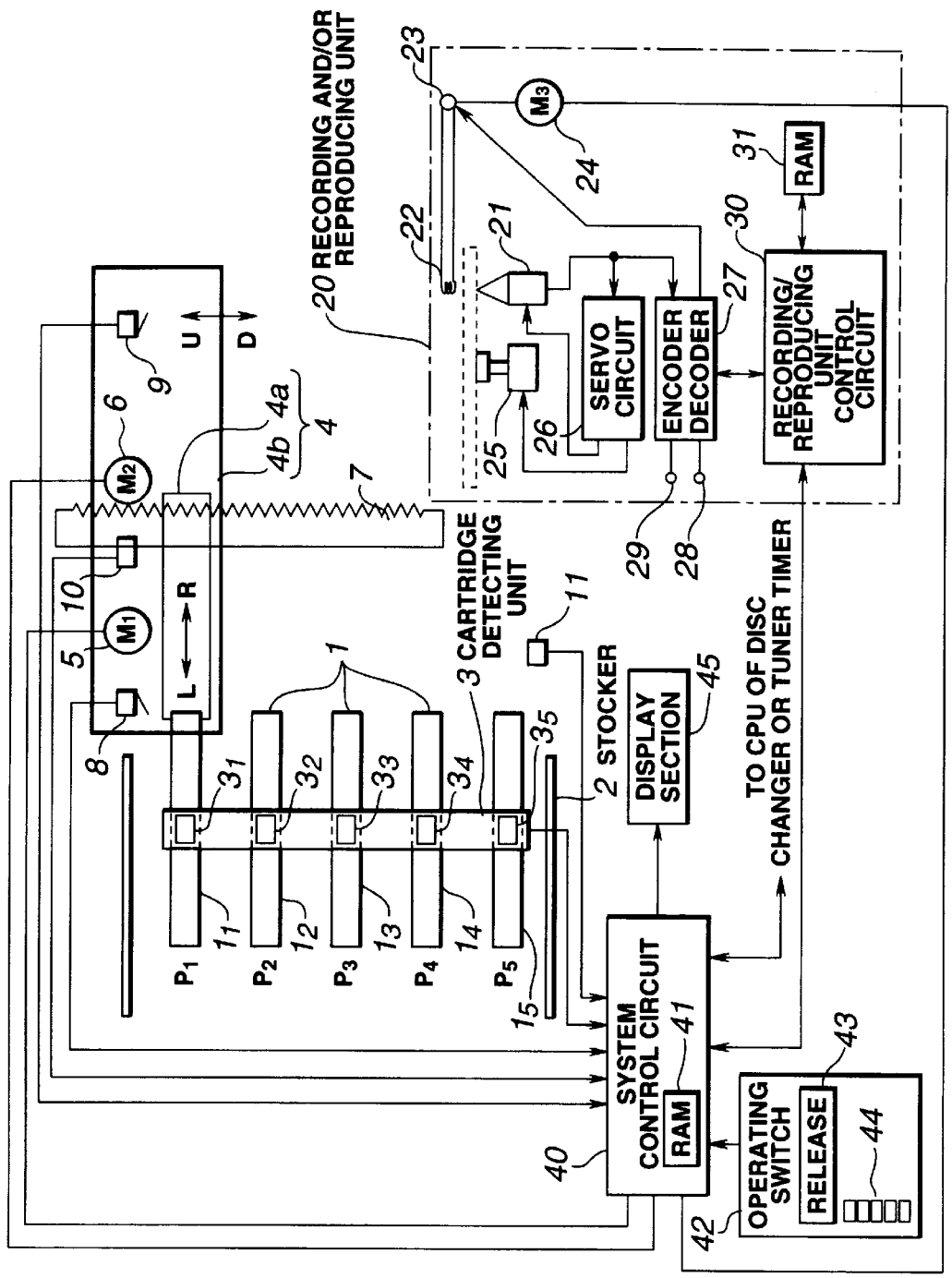
FIG. 4 is a view showing an exemplary structure of essential portions of the disc recording and/or reproducing apparatus.

FIG. 4 shows a more specific structure of essential portions of the disc recording and/or reproducing apparatus having the structure of FIG. 1.

That is, as shown in FIG. 4, the disc recording and/or reproducing apparatus includes a stocker 2 for housing five disc cartridges $1_1$, $1_2$, $1_3$, $1_4$ and $1_5$ at five housing positions $P_1$, $P_2$, $P_3$, $P_4$ and $P_5$, a cartridge detecting unit 3 for detecting presence or absence of the disc cartridge at each of the housing positions $P_1$, $P_2$, $P_3$, $P_4$ and $P_5$, and a recording and/or reproducing unit 20 for recording and/or reproducing information signals (hereinafter referred to as accessing, unless distinction is particularly needed) with respect to the one desired by the user from the five disc cartridges $1_1$, $1_2$, $1_3$, $1_4$ and $1_5$ housed in the stocker 2. The disc recording and/or reproducing apparatus also includes a carrier section 4 for taking out the desired disc cartridge from the stocker 2 to load the disc cartridge onto the recording and/or reproducing unit 20 and for taking out the desired disc cartridge from the recording and/or reproducing unit 20 to carry the disc cartridge to the stocker 2. The disc recording and/or reproducing apparatus also includes a system control circuit 40 so adapted that when a disc cartridge currently accessed by the recording and/or reproducing unit 20 is to be returned to its initial position in the stocker 2, if the cartridge detecting unit 3 outputs a detection signal indicating presence of a disc cartridge at the initial position, the currently accessed disc cartridge is returned to a housing position in the stocker 2 where the cartridge detecting unit 3 has detected absence of a disc cartridge.

The stocker 2 has the housing positions $P_1$, $P_2$, $P_3$, $P_4$ and $P_5$ for housing the five disc cartridges $1_1$, $1_2$, $1_3$, $1_4$ and $1_5$ in a stacked manner, with these disc cartridges facing the same direction.

The cartridge detecting unit 3 detects presence or absence of the disc cartridges housed at the housing positions $P_1$, $P_2$, $P_3$, $P_4$ and $P_5$ by using a mechanical switch at each of detectors $3_1$, $3_2$, $3_3$, $3_4$ and $3_5$.

The carrier section 4 has a slider 4a for leading the desired disc cartridge out of the housing position and leading the desired disc cartridge into the housing position, and an elevator 4b for holding the desired disc cartridge and raising and lowering the disc cartridge. The slider 4a is moved in directions shown by arrows L and R in FIG. 4 by a slider moving motor $M_1$ via a gear mechanism, not shown. The elevator 4b is moved in direction shown by arrows U and D in FIG. 4 by a driving force from an elevator moving motor $M_2$ via a gear mechanism, not shown, meshed with a rack gear formed on one end of a rack plate 7.

In the carrier section 4, a slider lead-in position detection switch for detecting leading-in of the slider 4a into the stocker 2 is provided. By outputting an on-signal of the detection switch into the system control circuit 40, it is notified that the slider 4a is located on the side of the stocker 2. In the carrier section 4, a slider lead-out position detection switch 9 for detecting leading-out of the slider 4a toward the recording and/or reproducing unit 20 is also provided. By outputting an on-signal from the detection switch 9 into the system control circuit 40, it is notified that the slider 4a is located on the side of the recording and/or reproducing unit 20.

The position of the elevator 4b is detected by an elevator position detection switch 10. This elevator position detection switch detects the position of the elevator 4b on the basis of a change of light which is transmitted through a slit formed in the rack plate 7 to reach two sets of light receiving elements, for example. The detection signal of the elevator position detection switch is supplied to the system control circuit 40.

When the desired disc cartridge is being accessed by the recording and/or reproducing unit 20 or when access by this apparatus is normally stopped, the carrier section 4 composed of the slider 4a and the elevator 4b moves the slider 4a toward the recording and/or reproducing unit 20 or toward the stocker 2, so as to be located at the lowermost position referred to as home position. The presence of the carrier section 4 at the home position is detected by a home position switch 11, which outputs a detection signal to the system control circuit 40.

The recording and/or reproducing unit 20 includes an optical head 21 for radiating reproducing or recording laser beams to the magneto-optical disc 65 as the recordable disc chucked and rotated by a spindle motor 25 when the carrier section 4 is lowered to be located at the home position with the disc cartridge led out, and a magnetic field modulation head 22 for supplying a modulated vertical magnetic field to an irradiation position where the recording laser beams are radiated from the optical head 21. The recording and/or reproducing unit 20 also includes a servo circuit 26 for calculating a detection signal obtained by a photodetector of the optical head 21 to move the light beams radiated onto the recordable disc in the direction of optical axis of the light beams or in the radial direction of the recordable disc, thereby performing focusing servo or tracking servo, and performing servo processing of the spindle motor 25. The recording and/or reproducing unit 20 also includes an encoder and decoder 27 for decoding the information signals recorded on the recordable disc using the detection signal from the photodetector and leading out the decoded signals from an output terminal 28, and for encoding information signals entered from an input terminal 29 and supplying the encoded signals to the optical head 21 and the magnetic field modulation head 22. The recording and/or reproducing unit 20 further includes a recording/reproducing unit control circuit 30 for controlling the entire recording and/or reproducing unit 20 including the encoder and decoder 27, and a RAM 31. The magnetic field modulation head 22 is held in a state rotated in the vertical direction from the recordable disc, that is, the magneto-optical disc by a rotation mechanism 23 driven by a rotation motor 24 and away from the recordable disc, except for the time of recording.

The reproducing processing of information signals by this recording and/or reproducing unit 20 will now be explained. The magneto-optical disc as the recordable disc is chucked onto the disc table. As an objective lens of the optical head 21 becomes close to the magneto-optical disc, the spindle motor 25 starts driving so that the magneto-optical disc is rotated.

In this case, the optical head 21 radiates laser beams to a target track on the magneto-optical disc via the objective lens, and obtains an output signal based on the return light from the magneto-optical disc by the photodetector. The output signal of the photodetector of the optical head 21 is supplied to the servo circuit 26 and to the encoder and decoder 27.

The servo circuit 26 is constituted by, for example, a focusing servo control circuit, a tracking servo control circuit, a spindle motor control circuit, and a thread servo control circuit. The encoder and decoder 27 calculates the detection signal from the optical head 21, obtains a reproduction output signal, and performs deinterleaving processing and decoding processing for error correction. The information signals thus decoded are temporarily written in the RAM 31 as a buffer memory controlled by the recording/reproducing unit control circuit 30, and then read out and outputted from the output terminal 28. By temporarily storing the signals in the RAM 31, the time for performing recovery operation in case where disturbance is applied is generated.

The recording processing of information signals onto the magneto-optical disc as the recordable disc by the recording and/or reproducing unit 20 will now be explained. The information signals entered from the input terminal 29 are processed by encoding processing and error correction processing by the encoder and decoder 27, and are supplied to the magnetic field modulation head 22. The magnetic field modulation head 22 generates a modulated vertical magnetic field in accordance with the encoded output signals. As the optical head 21 radiates the recording laser beams onto the magneto-optical disc, the coercive force on the signal recording surface of the magneto-optical disc is lowered so that the direction of magnetization on the signal recording surface changes in accordance with the direction of the vertical magnetic field supplied by the magnetic field modulation head 22. As a result, the direction of magnetization on the signal recording surface of the magneto-optical disc is changed on the basis of the information signals, and the information signals are recorded on the magneto-optical disc.

Figure 5:
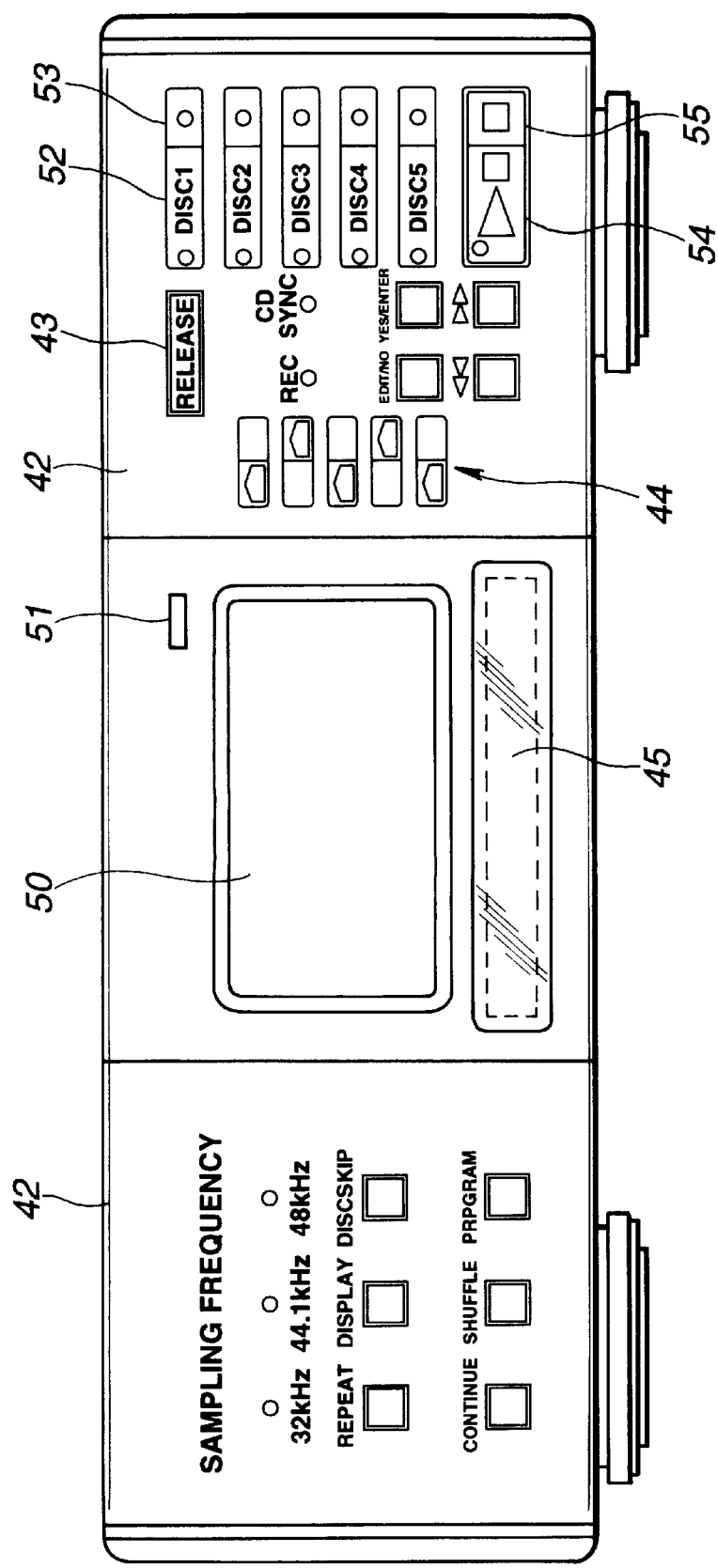
FIG. 5 is a view showing an example of an operating section of a disc recording/reproducing unit of the disc recording and/or reproducing apparatus.

FIG. 5 shows an example of appearance of the disc recording/reproducing unit 130 of the disc recording and/or reproducing apparatus of FIG. 1.

As the user operates each operating switch on an operating panel 42 as shown in FIG. 5, the system control circuit 40 takes out the desired disc cartridge from the stocker 2 using the carrier section 4 shown in FIG. 4, loads the disc cartridge on the recording and/or reproducing unit 20, and causes the recording and/or reproducing unit 20 to perform the recording or reproducing operation of the magneto-optical disc housed in the disc cartridge loaded thereon via the recording/reproducing unit control circuit 30.

On the operating panel 42, a release key (RELEASE) 43, ejection keys (EJECT) 44, disc selection keys 52, recording selection keys 53, a reproduction key 54 and a stop key 55 as shown in FIG. 5 are provided.

The release key 43 is a key for returning the disc cartridge currently accessed by the recording and/or reproducing unit 20 to a predetermined housing position in the stocker 2. Particularly when the user wishes to take out the disc cartridge from the predetermined housing position in the stocker 2, the user operates the ejection key 44 arranged near the corresponding housing position.

On the operating panel 42, there are also provided a sampling frequency display section (SAMPLING FREQUENCY) for displaying the sampling frequency, such as, 32 KHz, 44.1 KHz or 48 KHz, of the signal recorded on or reproduced from the magneto-optical disc of the disc cartridge to which accessing like recording or reproduction is being carried out, a repeat key (REPEAT) for repeating the access by the recording and/or reproducing unit 20, a display key (DISPLAY) associated with a display section 45 for displaying the name of the currently accessed disc cartridge or the name of the currently accessed track, a skip key (DISK SKIP) used for accessing disc cartridges other than the currently accessed disc cartridge, a continuing key (CONTINUE) for continuing accessing, a random reproduction key (SHUFFLE) for performing random reproduction, and a program key (PROGRAM) for performing program reproduction.

Figure 6:
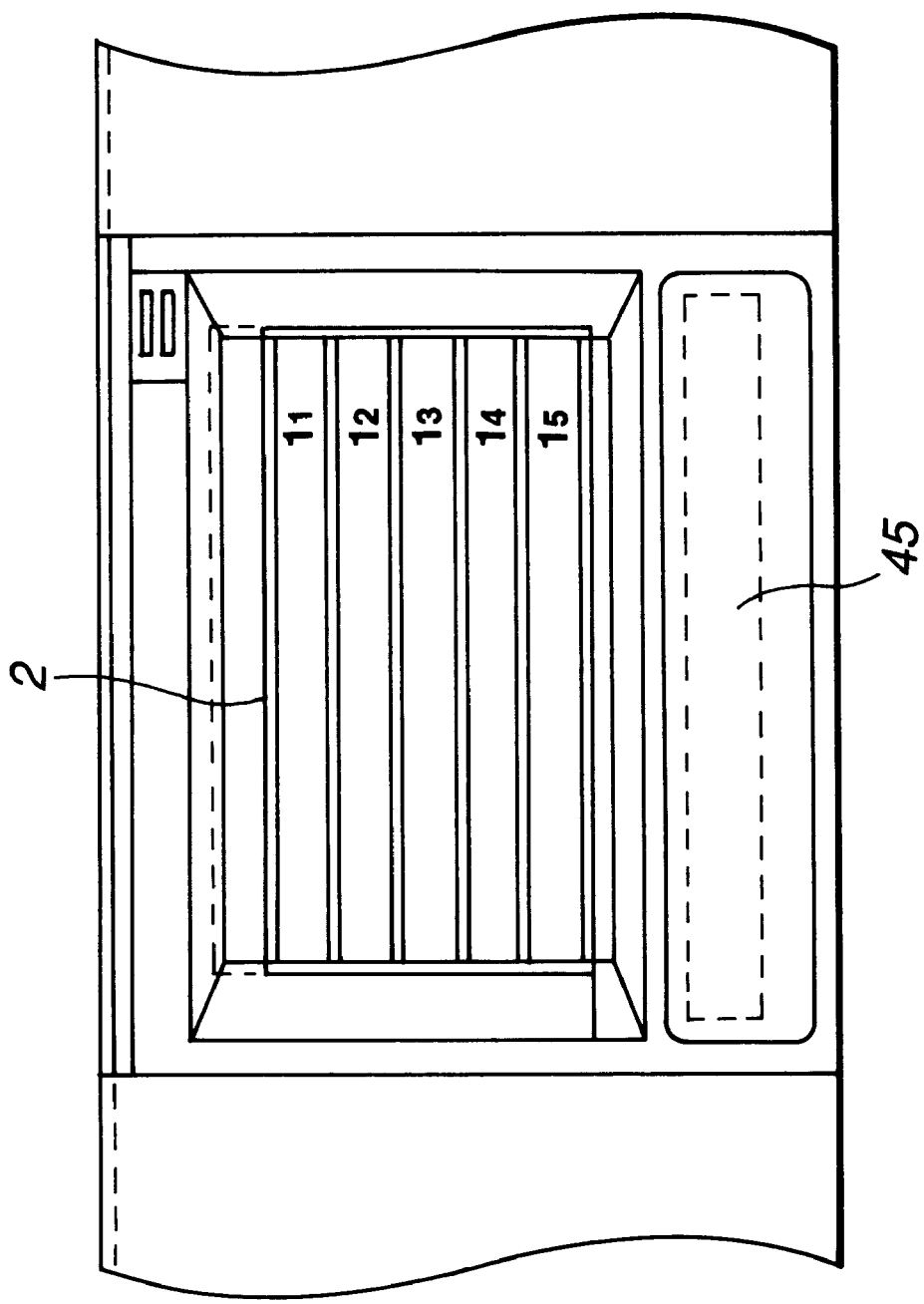
FIG. 6 is a view showing an example of a disc housing section of the disc recording/reproducing unit of the disc recording and/or reproducing apparatus.

As shown in FIG. 5, at the center portion of the operating panel 42, there is provided a cover portion 51 which has a stocker transparent portion 50 formed thereon for allowing the disc cartridges housed in the stocker 2 to be visually observed from outside. Therefore, the user can visually observe album names or the like described on the back portions of the five disc cartridges $1_1$, $1_2$, $1_3$, $1_4$ and $1_5$ even when the cover portion 51 is closed. On the lower part of the stocker transparent portion 50, a transparent portion for the display section 45 is also formed. When the disc cartridge is to be inserted into or ejected from the stocker 2, the cover portion 51 may be opened as shown in FIG. 6.

The recording/reproducing operation mode of the disc recording and/or reproducing apparatus of FIG. 1 will now be explained in detail.

First, the above-described second mode, that is, the "5 to 5" mode is explained.

This disc recording and/or reproducing apparatus has the "5 to 5" mode in which the contents recorded on five optical discs housed in the disc housing section 124a of the disc reproducing unit 120 can be recorded onto five recordable discs housed in the housing section 134a of the disc recording/reproducing unit 130. This mode is selected as the user operates the dial and keys of the operating section 112 of the amplifier/control unit 110.

Figure 7:
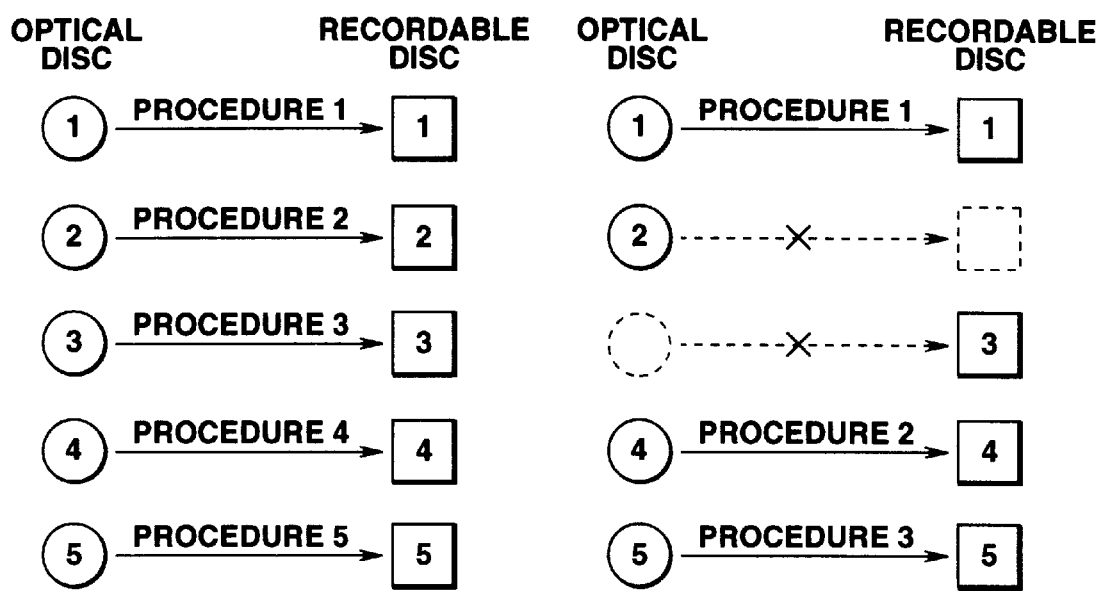
FIGS. 7(a) and 7(b) are views for explaining operation of a "1 to 5" mode in the disc recording and/or reproducing apparatus.

FIG. 7(a) is a view for explaining the operation at the time when the above-described mode is selected. In this case, "○" represents the first to fifth optical discs and "□" represents the first to fifth recordable discs. That is, in procedure 1, the contents of the first optical disc housed in the disc housing section 124a are recorded onto the first recordable disc housed in the housing section 134a. Similarly, in procedures 2 to 5, the contents of the second to fifth optical discs housed in the disc housing section 124a are sequentially recorded onto the second to fifth recordable discs housed in the housing section 134a. The indication as shown in FIGS. 7(a) and 7(b) may be displayed, for example, on the display section 113 of the amplifier/control unit 110.

At this point, for example, if the third optical disc as indicated by a dashed line among the five optical discs which should be housed in the disc housing section 124a is not housed therein, or if the second recordable disc among the five recordable discs which should be housed in the housing section 134a is not housed therein, that is, if any one of the optical discs and/or the recordable discs is not housed as in procedures 2 and 3 of FIG. 7(b), these procedures are not executed and the subsequent procedures are sequentially executed. When reproduction of the optical discs has been completed, or when recording onto the recordable discs has been completed, the processing in the "5 to 5" mode is ended. An error message indicating the end may be displayed on the display section 113 of the amplifier/control unit 110.

Figure 8:
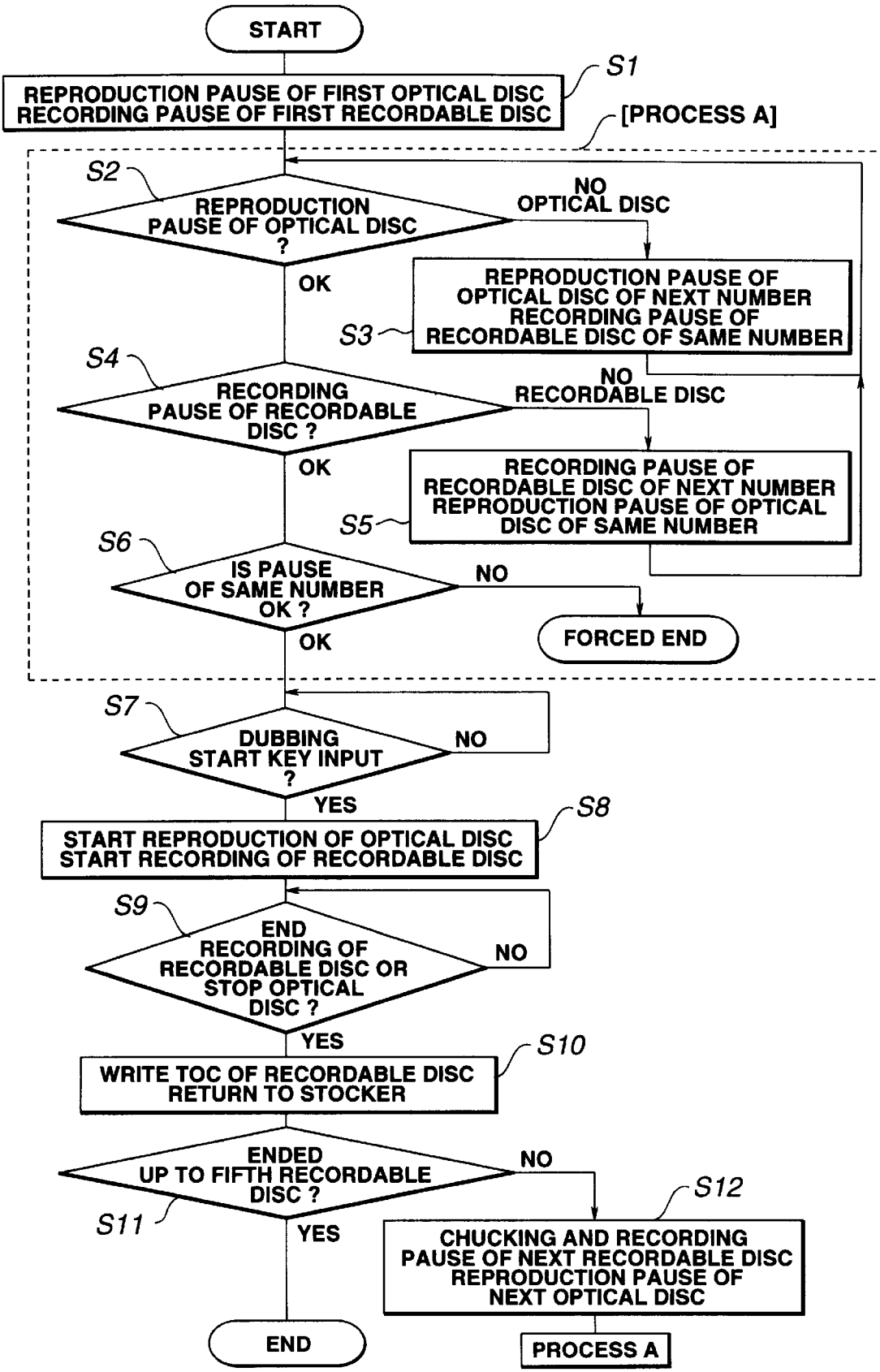
FIG. 8 is a flowchart showing an example of processing procedures of the "5 to 5" mode in the disc recording and/or reproducing apparatus.

FIG. 8 is an exemplary flowchart showing the flow of processing for executing one procedure in the recording/ reproducing operation mode, the "5 to 5" mode, as described above with reference to FIGS. 7(a) and 7(b).

At step S1, the disc carrier section 124b of the disc reproducing unit 120 takes out the first optical disc housed in the disc housing section 124a and loads it on the spindle, so that the disc reproducing section stands by for starting the reproducing operation (hereinafter referred to as reproduction pause). At this point, the optical head of the disc reproducing unit 120 is moved to a reading start position for the optical disc and then waits in a pause state for a reading start command. The carrier section 134b of the disc recording/reproducing unit 130 takes out the first recordable disc, in this case, the first disc cartridge, housed in the housing section 134a and loads (chucks) it on the recording/reproducing section 134c, so that the recording/reproducing section 134c stands by for starting the recording operation (hereinafter referred to as recording pause). At this point, the optical head and the magnetic head of the recording/reproducing section 134c may be moved to a recording start position.

At step S2, it is confirmed whether or not the first optical disc loaded on the disc reproducing section 124c of the disc reproducing unit 120 is in the reproduction pause state. When it is confirmed that the loaded optical disc is in the reproduction pause state, the operation proceeds to step S4. On the other hand, when the first optical disc is not loaded, the operation proceeds to step S3. Whether the first optical disc is loaded or not is detected in accordance with, for example, whether or not the table of contents information of the first optical disc held by the control circuit 121 of the disc reproducing unit 120 coincides with the table of contents information of the optical disc read out by the reproducing section 124c.

At step S3, the disc carrier section 124b of the disc reproducing unit 120 takes out the optical disc of the next number (in this case, the second optical disc) housed in the disc housing section 124a and loads it on the reproducing section 124c, so that the reproducing section 124c stands by for starting the reproducing operation (reproduction pause). The carrier section 134b of the disc recording/reproducing unit 130 takes out the second recordable disc housed in the housing section 134a and loads it on the recording/reproducing section 134c, so that the recording/reproducing section 134c stands by for starting the recording operation (recording pause). Then, the operation returns to step S2.

At step S4, it is confirmed whether or not the first recordable disc loaded on the recording/reproducing section 134c of the disc recording/reproducing unit 130 is in the recording pause state. When it is confirmed that the loaded recordable disc is in the recording pause state, the operation proceeds to step S6. On the contrary, when the first recordable disc is not loaded, the operation proceeds to step S5. Whether the first recordable disc is loaded or not may be discriminated by discriminating an output from the detector $3_1$ of the plural detectors $3_1$ to $3_5$ shown in FIG. 4 by the control circuit 131, or on the basis of the table of contents information by a technique similar to that used in the disc reproducing unit 120 as described above.

At step S5, the carrier section 134b of the disc recording/reproducing unit 130 takes out the recordable disc of the next number (in this case, the second recordable disc) housed in the housing section and loads it on the recording/reproducing section 134c, so that the recording/reproducing section 134c stands by for starting the recording operation (recording pause). The disc carrier section 124b of the disc reproducing unit 120 takes out the second optical disc housed in the disc housing section 124a and loads it on the reproducing section 124c, so that the reproducing section 124c stands by for starting the reproducing operation (reproduction pause). Then, the operation returns to step S2.

At step S6, it is confirmed whether or not both the optical disc and the recordable disc of the same number, for example, the second optical disc and the second recordable disc, are in the standby state. When it is confirmed that both of these discs are in the standby state, the operation proceeds to step S7. On the other hand, when both of these disc are not in the standby state, for example, when lead-in of the focusing servo may not be performed, the operation ends.

The process from step S2 to step S6, that is, the process for confirming whether or not both the optical disc and the recordable disc of the same number, for example, the second optical disc and the second recordable disc, are in the standby state, is a process to be used again and is hereinafter referred to as "process A".

At step S7, input of a dubbing start signal as a control signal indicating the start of dubbing is monitored. This dubbing start signal is inputted by, normally, pressing the enter key (ENTER) of the operating section 112 of the amplifier/control unit 110 or pressing the play key (PLAY) of the operating switch group 132 of the disc recording/reproducing unit 130. When it is confirmed that this control signal has been inputted, the operation proceeds to step S8.

At step S8, the reproduction pause state of the first optical disc is released so that reproduction of the optical disc by the reproducing section 124c is started. At the same time, the recording pause state of the first recordable disc is released so that recording of music signals reproduced from the optical disc by the reproducing section 124c onto the recordable disc by the recording/reproducing section 134c is started. The disc loading mechanism of the recording and/or reproducing apparatus using the recordable disc is generally more complicated than the disc loading mechanism of the reproducing apparatus for the so-called compact disc. Therefore, loading of the recordable disc is often more time-consuming than loading of the optical disc.

In consideration of this loading time, in the disc recording and/or reproducing apparatus according to the embodiment of the present invention, when the disc recording/reproducing unit 130 is ready to start recording, the above-described recording preparation completion signal as a control signal indicating the completion of preparation for recording is outputted from the control circuit 131. In the disc reproducing unit 120, when the control circuit 121 receives this recording preparation completion signal, the control circuit 121 performs control to start the reproducing operation of the optical disc. The disc reproducing unit 120 which has started the reproducing operation of the optical disc transmits information signals, such as, signals between musical pieces, to the disc recording/reproducing unit 130. On the basis of the information signals, the control circuit 131 of the disc recording/reproducing unit 130 performs control to actually start the recording operation to the recordable disc. Being ready to start recording in this case means a state where the above-described various servos are normally done on the recordable disc so as to simply wait for the data to be recorded. At this point, the optical head and the magnetic head are located at either the initial position or the recording start position. This also applies to the following operations.

At step S9, it is monitored whether or not the condition of "completion of recording onto the recordable disc" or "completion of reproduction of the optical disc" is satisfied. When either condition is satisfied, the operation proceeds to step S10. Whether the recording onto the recordable disc has been completed or not is determined by, for example, monitoring by the control circuit 131 whether or not there is no reproduced signal supplied from the reproducing unit 120 and whether or not there is no data held in the RAM 31 of FIG. 4. Whether the reproduction of the optical disc has been completed or not is determined by, for example, detecting by the control circuit 121 whether or not the last address of the information signals like music signals recorded on the optical disc has been reached, or whether or not the last address of the information signals programmed to be reproduced last has been reached in the case of the program reproduction. If the reproduction of the optical disc has ended even when the recording operation to the recordable disc is being continued, or if there is no recordable area of the recordable disc even when the reproducing operation of the optical disc is being continued, the operation proceeds to step S10.

At step S10, the table of contents (TOC) information indicating the contents of the recorded information is written and the recording operation to the recordable disc ends. The carrier section 134b returns the first recordable disc to the housing section 134a. The recordable disc has a data recording area in which information signals from the reproducing unit 120 are to be recorded, and a management information area in which management information including the table of contents information used for the recording or reproducing operation for the data recording area is to be recorded. In this management information area, the table of contents information is recorded before the recordable disc is returned to the housing section 134a by the carrier section 134b. This table of contents information is generated by the control circuit 131 during the recording operation and is stored in the RAM.

At step S11, whether the recording up to the fifth recordable disc has been completed or not is monitored by the control circuit 131. When the recording has been completed up to the fifth recordable disc, the operation in the "5 to 5" mode ends. On the other hand, when the recording has not been completed up to the fifth recordable disc, the operation proceeds to step S12.

At step S12, the carrier section 134b of the disc recording/reproducing unit 130 takes out the recordable disc of the next number (the recordable disc subsequent to the second recordable disc) from the housing section 134a and loads it on the recording/reproducing section 134c so that the recording/reproducing section 134c is ready for recording and is thus maintained in the recording pause state. The reproducing section 124c of the reproducing unit 120 is ready for starting reproduction from the leading part of the optical disc and is thus maintained in the reproduction pause state. Through the "process A" again, the operation returns to step S8 and repeats the similar procedures until the recording to the fifth recordable disc is completed.

The third mode, that is, the "1 to 5" mode, of the disc recording and/or reproducing apparatus of FIG. 1 is now explained.

This disc recording and/or reproducing apparatus has the "1 to 5" mode in which the contents recorded on an arbitrary one of up to five optical discs housed in the disc housing section 124a of the disc reproducing unit 120 can be sequentially recorded onto each of five recordable discs housed in the housing section 134a of the disc recording/reproducing unit 130. This "1 to 5" mode is selected as the user operates the dial and keys of the operating section 112 of the amplifier/control unit 110.

Figures 9A, 9B:
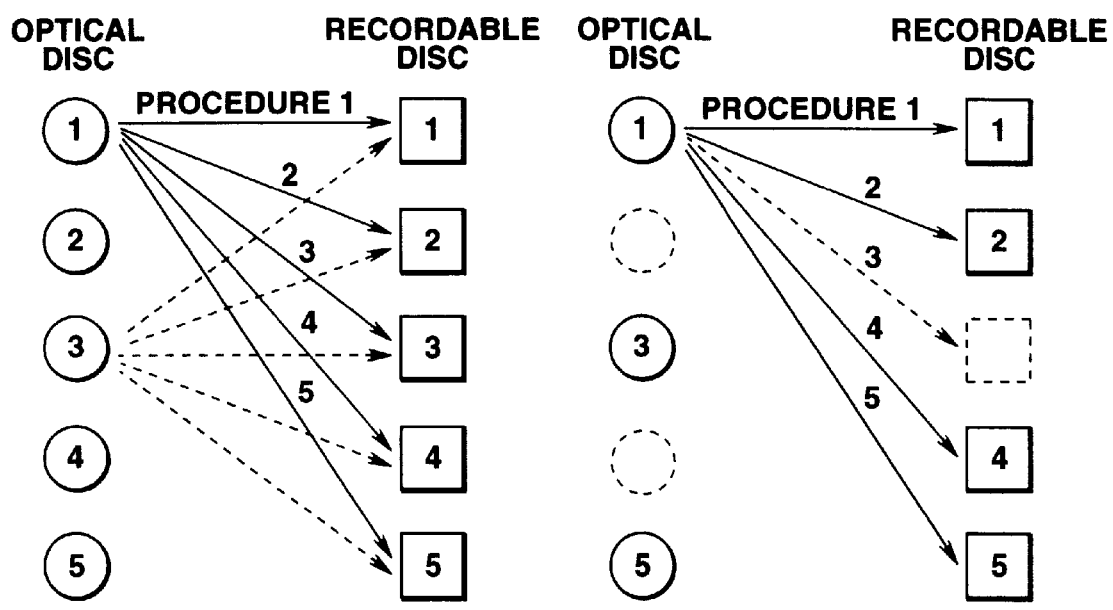
FIGS. 9(a) and 9(b) are views for explaining operation of a "1 to 5" mode in the disc recording and/or reproducing apparatus.

FIG. 9(a) is a view for explaining the operation at the time when the "1 to 5" mode is selected. In this case, "○" represents the first to fifth optical discs and "□" represents the first to fifth recordable discs. That is, in procedure 1, the contents of the first optical disc housed in the disc housing section 124a are recorded onto the first recordable disc housed in the housing section 134a. Similarly, in procedures 2 to 5, the contents of the first optical disc housed in the disc housing section 124a are sequentially recorded onto the second to fifth recordable discs. The indication as shown in FIGS. 9(a) and 9(b) may be displayed, for example, on the display section 113 of the amplifier/control unit 110.

At this point, for example, if the third optical disc among the five optical discs which should be housed in the disc housing section 124a is not housed therein, or if the second recordable disc among the five recordable discs which should be housed in the housing section 134a is not housed therein, that is, if any one of the optical discs and/or the recordable discs is not housed as in procedures 2 and 3 of FIG. 9(b), these procedures are not executed. The absent recordable disc is skipped and the operation to the next recordable disc is continuously executed. When the second optical disc shown in FIG. 9(b) is selected, an error message is displayed and the "1 to 5" mode is not executed.

At this point, for example, if the second and fourth optical discs as indicated by dashed lines among the five optical discs which should be housed in the disc housing section 124a are not housed therein, or if the third recordable disc among the five recordable discs which should be housed in the housing section 134a is not housed therein, the procedure for performing recording onto the recordable disc not housed therein is not executed and the recording operation to the subsequent recordable disc is sequentially executed. When the optical disc not housed in the disc housing section 124a is designated, the "1 to 5" mode is not entered and an error message indicating this is displayed on the display section 113 of the amplifier/control unit 110.

In this disc recording and/or reproducing apparatus, the optical disc to be reproduced in the "1 to 5" mode can be arbitrarily designated. However, if the designation is not performed, the optical disc loaded on the reproducing section 124c is preferentially selected. When the reproduction of the selected optical disc has been completed, or when the recording to the recordable disc has been completed, the operation in the "1 to 5" mode ends. Whether the reproduction or recording has been completed or not is detected in a manner similar to that of the "5 to 5" mode as described above.

Figure 10:
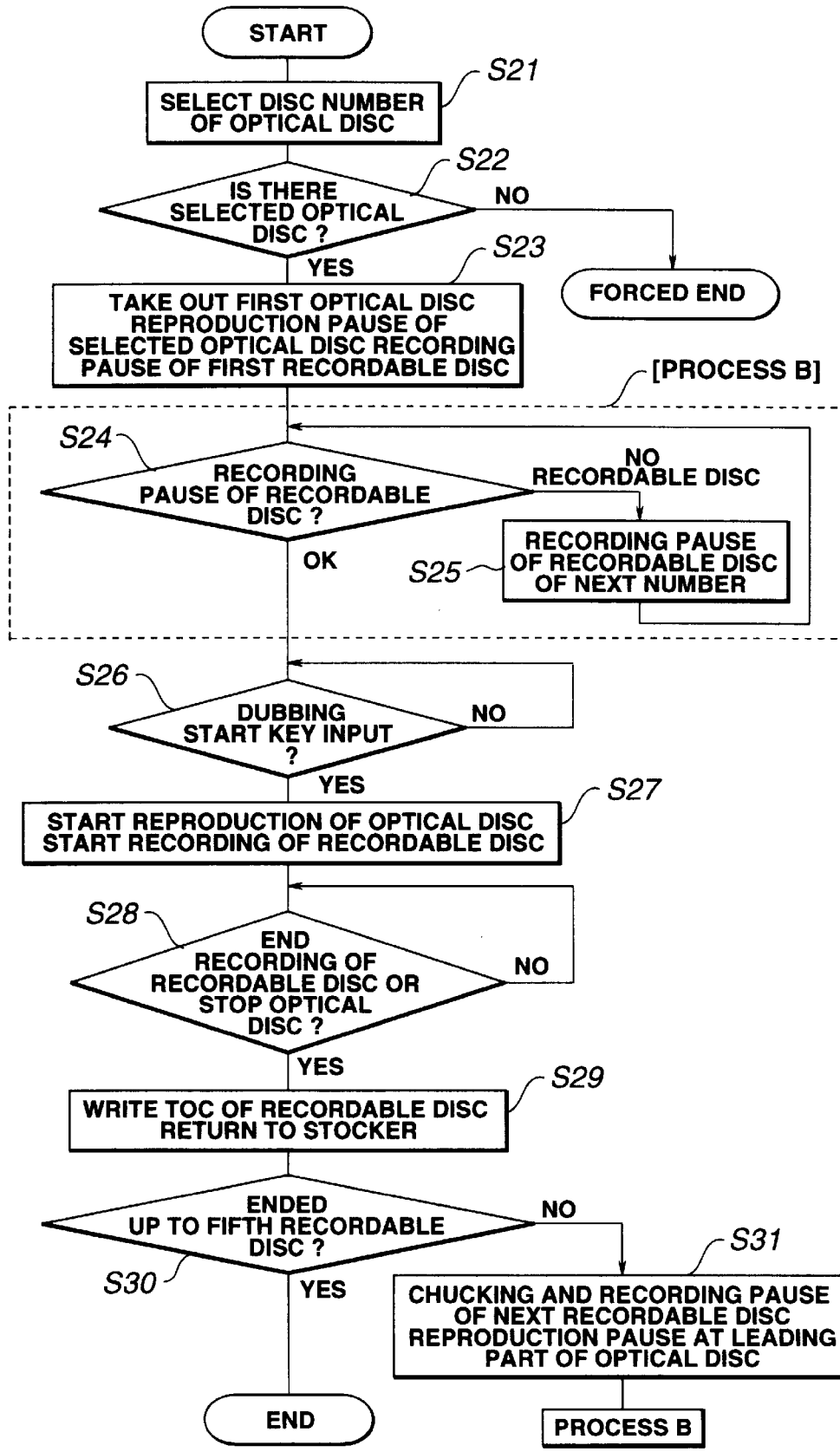
FIG. 10 is a flowchart showing an example of processing procedures of the "1 to 5" mode in the disc recording and/or reproducing apparatus.

FIG. 10 is an exemplary flowchart showing the flow of processing for executing one procedure in the recording/reproducing operation mode, the "1 to 5" mode, as described above with reference to FIGS. 9(a) and 9(b).

At step S21, the user uses the operating section 112 of the amplifier/control unit 110 to designate the number of a desired optical disc housed in the disc housing section 124a of the disc reproducing unit 120.

At step S22, it is confirmed whether or not the optical disc designated at step S21 is housed in the disc housing section 124a. When it is confirmed that the designated optical disc is housed therein, the operation proceeds to step S23. On the other hand, when the designated optical disc is not housed therein, the operation forcedly ends. Whether the designated optical disc is housed or not is detected by providing a detecting sensor on the housing section 124a of the disc reproducing unit 120.

At step S23, the disc carrier section 124b of the disc reproducing unit 120 takes out the designated optical disc from the housing section and loads the optical disc on the reproducing section 124c, so that the reproducing section 124c is ready for reproduction and is thus maintained in a standby (reproduction pause) state. The carrier section 134b of the disc recording/reproducing unit 130 takes out the first recordable disc from the housing section 134a and loads the recordable disc on the recording/reproducing section 134c, so that the recording/reproducing section 134c is ready for recording and is thus maintained in a standby (recording pause) state.

At step S24, it is confirmed whether or not the first recordable disc is in the recording pause state. When it is detected that the first recordable disc is not loaded, the operation proceeds to step S25. Then, the next recordable disc (in this case, the second recordable disc) is taken out from the housing section 134a and loaded on the recording/reproducing section 134c, so that the recording/reproducing section 134c is ready for recording and is thus maintained in the standby (recording pause) state. Then, the operation proceeds to step S26. On the other hand, when it is confirmed that the first recordable disc is in the recording pause state, the operation proceeds directly to step S26. Whether the first recordable disc is loaded or not is detected by a technique similar to that used in the "5 to 5" mode as described above.

The process of step S24 to step S25, that is, the process for confirming whether or not the recordable disc is in the recording pause state, is a process to be used again and is hereinafter referred to as "process B".

At step S26, input of a dubbing start signal as a control signal indicating the start of dubbing is monitored. This dubbing start signal is inputted by, normally, pressing the enter key (ENTER) of the operating section 112 of the amplifier/control unit 110 or pressing the play key (PLAY) of the operating switch group 132 of the disc recording/reproducing unit 130. When this control signal has been inputted to the control circuit 121 or the control circuit 131, the operation proceeds to step S27.

At step S27, the reproduction pause state of the first optical disc is released so that reproduction of the optical disc by the reproducing section 124c is started. At the same time, the recording pause state of the first recordable disc is released so that recording of music signals reproduced from the first optical disc by the reproducing section 124c onto the first recordable disc by the recording/reproducing section 134c is started. The disc loading mechanism of the recording and/or reproducing apparatus using the recordable disc is generally more complicated than the disc loading mechanism of the reproducing apparatus for the so-called compact disc. Therefore, loading of the recordable disc is often more time-consuming than loading of the optical disc.

In consideration of this loading time, in the disc recording and/or reproducing apparatus according to the embodiment of the present invention, when the disc recording/reproducing unit 130 is ready to start recording, the above-described recording preparation completion signal as a control signal indicating the completion of preparation for recording is transmitted. On receiving this recording preparation completion signal, the disc reproducing unit 120 starts the reproducing operation of the optical disc by the reproducing section 124c. The disc reproducing unit 120 which has started the reproducing operation of the optical disc transmits information signals, such as, signals between musical pieces, to the control circuit 131 of the disc recording/reproducing unit 130. On the basis of the information signals, the disc recording/reproducing unit 130 releases the recording pause state and actually starts the recording operation to the recordable disc.

At step S28, it is monitored whether or not the condition of "completion of recording onto the recordable disc" or "completion of reproduction of the optical disc" is satisfied. When either condition is satisfied, the operation proceeds to step S29. Whether the recording onto the recordable disc has been completed or not, and whether the reproduction of the optical disc has been completed or not, are determined by techniques similar to those used in the "5 to 5" mode as described above.

At step S29, the table of contents (TOC) information indicating the contents of the recorded information is written and the recording operation to the recordable disc ends. The carrier section 134b returns the first recordable disc to the housing section 134a. The recording operation of this table of contents information is performed in a manner similar to the above-described step S10.

At step S30, whether the recording up to the fifth recordable disc has been completed or not is monitored by the control circuit 131. When the recording has been completed up to the fifth recordable disc, the operation in the "1 to 5" mode ends. On the other hand, when the recording has not been completed up to the fifth recordable disc, the operation proceeds to step S31.

At step S31, the carrier section 134b of the disc recording/reproducing unit 130 takes out the next recordable disc (the recordable disc subsequent to the second recordable disc) from the housing section 134a and loads it on the recording/reproducing section 134c so that the recording/reproducing section 134c is ready for recording and is thus maintained in the recording pause state. The reproducing section 124c of the reproducing unit 120 is ready for starting reproduction from the leading part of the optical disc and is thus maintained in the reproduction pause state. Through the "process B" again, the operation returns to step S27 and repeats the similar procedures until the recording to the fifth recordable disc is completed.

The fourth mode, that is, the "5 to 1" mode, of the disc recording and/or reproducing apparatus of FIG. 1 is now explained.

This disc recording and/or reproducing apparatus has the "5 to 1" mode in which only the contents recorded on an arbitrary track (for example, the first track) of each of up to five optical discs housed in the disc housing section 124a of the disc reproducing unit 120 can be sequentially recorded onto an arbitrary or selected one of up to five recordable discs housed in the housing section 134a of the disc recording/reproducing unit 130. This "5 to 1" mode is selected as the user operates the dial and keys of the operating section 112 of the amplifier/control unit 110.

Figures 11A, 11B:
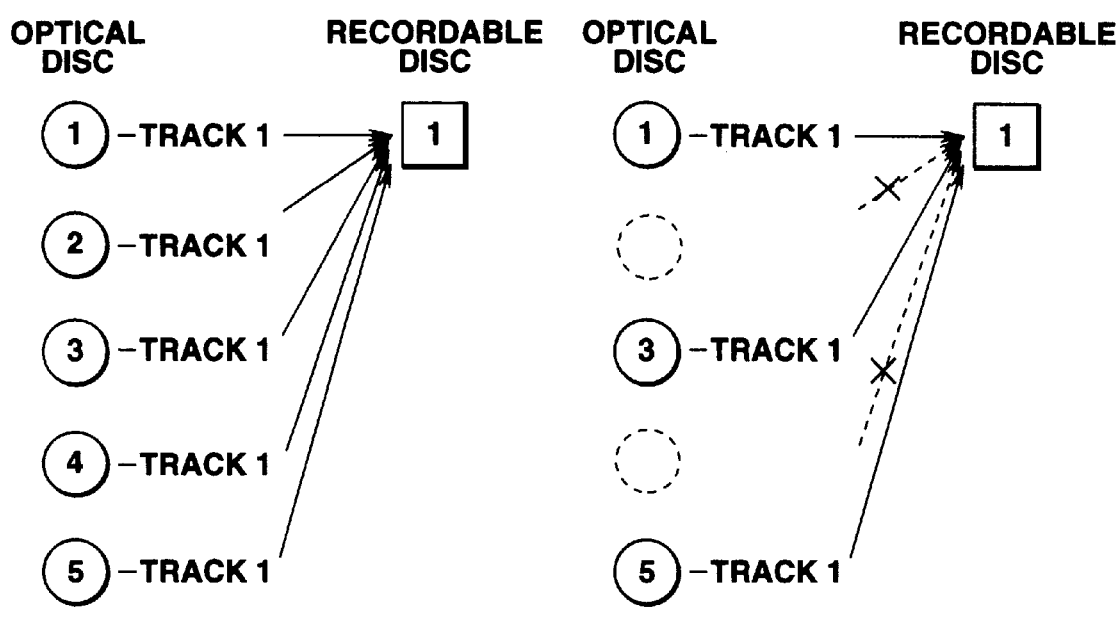
FIGS. 11(a) and 11(b) are views for explaining operation of a "5 to 1" mode in the disc recording and/or reproducing apparatus.

FIG. 11(a) is a view for explaining the operation at the time when the "5 to 1" mode is selected. In this case, "○" represents the first to fifth optical discs and "□" represents the first to fifth recordable discs. That is, only the contents of the first track of each of the optical discs housed in the disc housing section 124a are sequentially recorded onto, for example, the first recordable disc housed in the housing section 134a. Thus, the above-described mode in which only the contents recorded on the first track of the optical discs are collectively recorded onto one recordable disc is referred to as the "5 to 1" mode.

At this point, for example, if the second and fourth optical discs among the five optical discs which should be housed in the disc housing section 124a are not housed therein, the second and fourth optical discs are not displayed on the display section 113 as shown in FIG. 11(b). The procedures for recording the contents of the optical discs not housed therein are not executed. The subsequent optical discs, in this case, the third and fifth optical discs, are sequentially taken out from the housing section 124a, and information signals on the first track of each of these optical discs are reproduced by the reproducing section 124c.

The indication as shown in FIGS. 11(a) and 11(b) may be displayed, for example, on the display section 113 of the amplifier/control unit 110. If there is any optical disc not housed in the housing section, an error message indicating this may be displayed on the display section 113 of the amplifier/control unit 110.

The plural recordable discs are housed in the housing section 134a. Therefore, in order to prevent erroneous recording on these recordable discs, when the recording/reproducing operation mode is selected in this disc recording and/or reproducing apparatus, the control circuit 131 performs control such that recording may be carried out only on the first recordable disc.

In the case where the contents of more than five optical discs are to be recorded continuously, after the above-described flow of operation is completed, the optical discs housed in the disc housing section 124a may be exchanged during or after the recording operation by the recording/reproducing section 134c so that the recording of the contents of the sixth and subsequent optical discs may be continued. In this case, the "5 to 1" mode is maintained until the recording operation of the recordable discs is completed. When the reproduction of the optical disc has been completed, or when the recording onto the recordable disc has been completed, the operation in the "5 to 1" mode ends.

In the above-described recording/reproducing operation mode, the flow of operation for executing the so-called hit parade recording is similar to the flow shown in FIG. 8. In this case, however, at step S19 for determining whether the reproduction of the optical disc has been completed or not, a code (subcode) for reproducing only a desired track is used for the determination.

Although the above-described embodiments are explained using the magneto-optical disc as the recordable disc, a phase-changed type optical disc or a magnetic disc may be used. In addition, the present invention is applicable not only in the case where the disc-shaped recording medium is used but also in the case where a recording medium housed in the stocker and exchangeable by the media exchange mechanism, for example, a digital audio tape, is used. It is a matter of course that various modifications and changes may be effected without departing from the scope of the present invention.

What is claimed is:

1. A recording and reproducing apparatus, comprising:
a reproducing unit having a plurality of first recording media loaded thereon and adapted for reproducing at least two of the plurality of first recording media; and
a recording unit having a plurality of recordable second recording media loaded thereon, each having a recording area capable of recording information signals therein and a management information area in which management information including at least table of contents information indicating contents of the information signals recorded in the recording area is recorded, and adapted for recording information signals onto one of the plurality of loaded second recording media, the recording unit recording the information signals reproduced by the reproducing unit onto the second recording medium, the recording unit supplying to the reproducing unit a control signal indicating completion of preparation for recording the information signals onto the second recording medium;
wherein the reproducing unit starts reproducing one of the first recording media on the basis of the control signal indicating completion of preparation for recording supplied from the recording unit, and supplies reproduced signals to the recording unit, and the reproducing unit has a first housing section for housing the plurality of first recording media loaded thereon and a first carrier mechanism for taking out one of the first recording media from the first housing section and carrying the first recording medium to the reproducing unit, and the recording unit has a second housing section for housing the plurality of second recording media loaded thereon and a second carrier mechanism for taking out one of the second recording media from the second housing section and carrying the second recording medium to the recording unit, so that after completion of reproduction of the first recording medium by the reproducing unit or completion of recording of the information signals onto the second recording medium by the recording unit, then exchanging the first recording medium of the reproducing unit and loading another first recording medium to set the reproducing unit in a reproduction standby state while resetting the recording unit in a recording stand by state after completion of recording of the one second recording medium by the recording unit, having the reproduction standby state of the reproducing unit released on the basis of the control signal indicating completion of preparation for recording of the recording unit so as to start reproduction of the another first recording medium, and recording the reproduced signals from the reproducing unit onto the one second recording medium by the recording unit, recording in the management information area table of contents information indicating contents of the information signals recorded in the recorded area.

2. The recording and reproducing apparatus as claimed in claim 1, wherein the reproducing unit is set in a reproduction standby state when the first recording medium is loaded thereon, the reproducing unit having the reproduction standby state released on the basis of the control signal indicating completion of preparation for recording so as to start reproduction of the first recording medium.

3. The recording and reproducing apparatus as claimed in claim 2, wherein the recording unit is set in a recording standby state and outputs the control signal indicating completion of preparation for recording when the second recording medium is loaded thereon, the recording unit having the recording standby state released by the reproduced signals supplied from the reproducing unit so as to record the reproduced signals from the reproducing unit onto the second recording medium.

4. The recording and reproducing apparatus as claimed in claim 3, wherein the recording unit records the management information of the information signals recorded in the recording area into the management information area of the second recording medium after completion of reproduction of the first recording medium by the reproducing unit.

5. The recording and reproducing apparatus as claimed in claim 4, wherein the reproducing unit ends reproduction of the first recording medium when recording of the information signals onto the second recording medium by the recording unit is completed during the reproduction of the first recording medium.

6. The recording and reproducing apparatus as claimed in claim 3, wherein the recording unit records the management information of the information signals recorded in the recording area into the management information area of the second recording medium before the second recording medium is returned to the second housing section by the second carrier mechanism, so that the second recording medium is returned to the second housing section by the second carrier mechanism after completion of the recording of the management information.

7. The recording and reproducing apparatus as claimed in claim 1, the apparatus repeating operations of exchanging the first recording medium by the first carrier mechanism to set the reproducing unit in a reproduction standby state while exchanging the second recording medium by the second carrier mechanism to set the recording unit in a recording standby state after completion of recording of one of the second recording media by the recording unit, having the reproduction standby state released on the basis of the control signal indicating completion of preparation for recording of the recording unit so as to start reproduction of the first recording medium, and recording the reproduced signals from the reproducing unit onto the second recording medium by the recording unit.

8. The recording and reproducing apparatus as claimed in claim 1, wherein the reproduced signals of the first recording medium and the another first recording medium reproduced by the reproducing unit are recorded by the recording unit onto each of the second recording media housed in the second housing section.

9. A recording and reproducing method using a reproducing unit for reproducing at least two of a plurality of first recording media which are housed in a first housing section and in which information signals are recorded, and a recording unit for recording the information signals reproduced by the reproducing unit onto one of second recording media which are housed in a second housing section and each of which has a recording area capable of recording information signals therein and a management information area having recorded therein management information including at least table of contents information of the information signals recorded in the recording area, the method comprising the steps of:

taking out one of the first recording media from the first housing section, loading the one first recording medium onto the reproducing unit, and setting the reproducing unit to a reproduction standby state for the loaded first recording medium; and taking out one of the second recording media from the second housing section, loading the one second recording medium onto the recording unit, setting the recording unit to a recording standby state for the loaded one second recording medium, and outputting a control signal indicating completion of preparation for recording;

wherein the reproducing unit starts reproducing the first recording medium on the basis of the control signal indicating completion of preparation for recording supplied from the recording unit and supplies reproduced signals to the recording unit while the recording unit records the reproduced signals supplied thereto onto the one second recording medium, recording in the management information area table of contents information indicating contents of the information signals recorded in the recorded area, then exchanging the first recording medium of the reproducing unit and loading another first recording medium to set the reproducing unit in a reproduction standby state while resetting the recording unit in a recording standby state after completion of recording of the one second recording medium by the recording unit, having the reproduction standby state of the reproducing unit released on the basis of the control signal indicating completion of preparation for recording of the recording unit so as to start reproduction of the another first recording medium, and recording the reproduced signals from the reproducing unit onto the one second recording medium by the recording unit, recording in the management information area table of contents information indicating contents of the information signals recorded in the recorded area.

10. The recording and reproducing method as claimed in claim 9, wherein the reproducing unit is set in the reproduction standby state when the first recording medium is loaded on the reproducing unit, the reproducing standby state being released on the basis of the control signal indicating completion of preparation for recording so as to start reproduction of the first recording medium.

11. The recording and reproducing method as claimed in claim 10, wherein the recording unit is set in the recording standby state and outputs the control signal indicating completion of preparation for recording when the second recording medium is loaded on the recording unit, the recording unit having the recording standby state released by the reproduced signals supplied from the reproducing unit so as to record the reproduced signals from the reproducing unit onto the second recording medium.

12. The recording and reproducing method as claimed in claim 11, wherein after completion of reproduction of the first recording medium by the reproducing unit, the recording unit records the management information of the information signals recorded in the recording area into the management information area of the second recording medium.

13. The recording and reproducing method as claimed in claim 12, wherein the reproduction of the first recording medium by the reproducing unit is ended when recording of the information signals onto the second recording medium by the recording unit is completed during the reproduction of the first recording medium by the reproducing unit.

14. The recording and reproducing method as claimed in claim 9, wherein the reproduced signals of the first recording medium and the another first recording medium reproduced by the reproducing unit are recorded by the recording unit onto each of the second recording media housed in the second housing section.

* * * * *